United States Patent Office 3,274,292
Patented Sept. 20, 1966

3,274,292
UNSATURATED POLYESTERS PREPARED FROM COMPLEX SULFUR-CONTAINING CARBOXYLIC ACIDS DERIVED FROM PETROLEUM
Louis A. Joo, Johnson City, Tenn., and Theodore H. Szawlowski, Wonder Lake, Ill., assignors, by mesne assignments, to Union Oil Company of California, Los Angeles, Calif., a corporation of California
No Drawing. Filed Dec. 26, 1962, Ser. No. 247,356
20 Claims. (Cl. 260—867)

This invention relates to novel polyesters and a method for their preparation from certain complex, high-molecular-weight, polynuclear, alkylaromatic and heterocyclic monobasic acids prepared by the fractionation of certain mixtures of acids derived from sulfur-containing aromatic compounds of petroleum origin, hereinafter defined, by metalation and carbonation, or by metalation, carbonation, acidification, and subsequent transformation into metal salt form for fractionation.

It is known in the art to prepare polyester resins from saturated and unsaturated dibasic acids and diols. In general, monobasic acids are not used to prepare polyester resins because they terminate the polyester chains and reduce the strength of the resulting esters. Such acids are referred to as chain stoppers. A monohydric alcohol has the same effect. Certain dibasic aromatic acids are used to modify the properties of polyester resins. In order to illustrate the distinction of this invention over the prior art, some of the dibasic aliphatic acids which have been used are malonic, succinic, glutaric, adipic, pimelic, suberic, azelaic, and sebacic acids, while some of the aromatic dibasic acids are isophthalic acid and terephthalic acid. When the prior art uses unsaturated materials to promote cross-linking, the use of such substances as the reaction adducts of hexahalocyclopentadienes with monoolefinic polycarboxylic acids or anhydrides, or mono-olefinic polyhydric alcohols, or esters thereof including acid chlorides, is contemplated. In some instances, the polyesters can be rendered copolymerizable in the cross-linking reaction by incorporating in the esterification product a reactive and unsaturated product formed from the reaction of hexahalocyclopentadiene and an unsaturated polycarboxylic acid or acid halide, or an unsaturated polyhydric alcohol or ester thereof, by the Diels-Alder reaction.

In accordance with this invention, we have discovered that polyesters prepared by esterifying a mixture of certain monocarboxylic acids derived from certain sulfur-containing aromatic compounds of petroleum origin of the group consisting of (1) solvent extracts, obtained in the solvent refining of mineral lubricating oils with a solvent selective for aromatic compounds, (2) hydrogenated or otherwise refined solvent extracts and (3) FCC recycle stock, and (4) decant oil from FCC processing and mixtures of these source materials, an unsaturated dibasic acid and a polyol or a mixture of polyols and one or more diols, and cross-linking the resulting polyester with an unsaturated monomer in the presence of a polymerization catalyst produces cross-linked resins having higher tensile strengths and greater flexibilities than conventional cross-linked resins. The improvements in the resin properties are directly attributable to the combined use of a polyol with monocarboxylic acids derived from solvent extracts. The presence of an unsaturated dibasic acid and a polyol, or mixture of polyol and diol, produces unsaturated polyester intermediates which can be further co-polymerized and cross-linked with unsaturated monomers, to yield products of desired properties. Also, the unsaturated polyester intermediate or the partly polymerized unsaturated polyester intermediate can be styrenated to produce a copolymerized product exhibiting enhanced properties.

Another feature of this invention is the discovery that a novel class of polyester resins can be prepared by polymerizing a mixture of certain selected monobasic acids derived from solvent extracts with known dibasic acids and polyols higher than diols. The resins of this invention differ from the prior art formulations in that they contain monobasic acids of high-molecular weight in place of the conventional dibasic acids, and a polyol in place of part of the conventional diols.

The resins of this invention have utility in those applications where tensile strength and hardness are desired and can be used to form hard polyester castings. The mold-cured products are hard and free from tackiness. Surfaces coated with the resins of this invention are free from stickiness and are resilient and resistant to cracking. These properties are attained without the necessity of incorporating waxes, oils or plasticizers in the polyester resins. The resins of this invention are particularly suitable for producing formed objects having either large or small surface areas or large or small solid parts. Lacquer films are readily prepared from the resins of this invention by applying conventional techniques and the films harden under free access of air to a smooth, pliant surface without tackiness at ambient temperatures. The resins of this invention can be pigmented or dyed. For this purpose, titanium oxide, cadmium lithopones, indanthrene blues, red, yellow and maroon, copper phthalocyanine blues and greens, etc., can be used. The products of this invention can be used wherever flame retardation and heat resistance in castings, moldings, foamed articles, laminated structures, etc., are required. In addition, the products of this invention are water-resistant, infusible, and insoluble in most organic solvents.

The monocarboxylic acids used as the novel ingredient in resin preparation in accordance with this invention are prepared in accordance with several copending United States patent applications, the disclosures of which are hereby incorporated by reference. Briefly, the acids are prepared by subjecting a source material containing complex polynuclear aromatic heterocyclic (sulfur-containing) compounds of petroleum origin as illustrated by solvent extracts, obtained in the solvent extraction of mineral lubricating oils with a solvent selective for aromatic compounds, to metalation to form the metal adduct, carbonation to form the corresponding salt of the carboxylic acid, acidification (with a minerial acid), to form the free acids, and fractionation to separate one or more fractions which are predominantly monobasic. The metalation, carbonation and acidification reactions produce complex acids having from 1 to 5 and as many as 7 carboxyl groups attached to the complex, high-molecular-weight, polynuclear or condensed ring aromatic, alkyl aromatic and heterocyclic compounds present in the source material i.e., solvent extracts. The fractionation process separates the acids which are predominantly monocarboxylic from the balance of di- and polybasic complex acids.

Copending applications bearing Serial Nos. 819,932 filed June 12, 1959 by T. W. Martinek (now abandoned and application Serial No. 220,344 filed August 1, 1962, as a continuation thereof), 79,661, filed December 30, 1960 (now U.S. Patent 3,153,087), and 160,882, filed December 20, 1961 (now U.S. Patent 3,222,137), describe in detail the metalation, carbonation and acidification reactions as applied to solvent extracts and other sources of complex organic polynuclear alkylaromatic compounds to prepare the mixed mono-, di-, and polycarboxylic acids. Application Serial No. 160,882 also describes an apparatus for carrying out the reaction on a continuous basis. The treatment of the resulting mixed acids to separate those acids which are predominantly monobasic may be accomplished by various methods. However, because of the complexity of the acid mixture such separation is facilitated by applying the methods of fractionation disclosed and described in detail in copending applications:

| Serial No. | Filing date | Inventors |
| --- | --- | --- |
| 161,355 | Dec. 22, 1961 | L. A. Joo et al. (now U.S. Patent No. 3,228,963). |
| 207,741 (now abandoned) | July 13, 1962 | L. A. Joo. |
| 207,780 (now U.S. Patent No. 3,180,876) | July 13, 1962 | L. A. Joo. |
| 247,358 | Dec. 26, 1962 | L. A. Joo et al. |

Accordingly, it becomes a primary object of this invention to provide a novel polyester and compositions containing same.

An object of this invention is to provide a method of preparing novel polyesters.

An object of this invention is to provide a novel class of polyesters prepared from certain high-molecular-weight, monobasic acids.

Another object of this invention is to provide polyesters prepared by esterifying a mixture of monobasic acids derived from solvent extracts by metalation, carbonation, acidification, and fractionation, an unsaturated dibasic acid, and a polyol, or a mixture of a polyol and diol, in the presence or absence of an esterification catalyst.

Still a further object of this invention is to provide novel polyester resins having higher tensile strengths and hardness than conventional resins.

Another object of this invention is to provide a polyester resin which is modified by co-polymerization with an olefinic monomer.

These and other objects of this invention will be described or become apparent as the specification proceeds.

The high-molecular-weight, complex, alkylaryl and heterocyclic monobasic acids used in accordance with this invention are prepared by metalation, carbonation and acidification of a complex high-molecular-weight polynuclear aromatic sulfur-containing compound of petroleum origin which source materials are illustrated by solvent extracts, hydrogenated or otherwise refined solvent extracts, FCC recycle stock and decant oil from FCC processes. The invention is best illustrated by complex monobasic acids prepared from solvent extracts, which are well known by-products of the solvent extraction of mineral lubricating oils. This source material is adequately described as the aromatic materials separated from mineral lubricating oils and their fractions, e.g., those aromatic compounds obtained in the extract phase in the manufacture and refining of neutral oils and bright stocks during treatment with a selective solvent designed to extract the predominantly aromatic materials from the paraffinic materials. Solvent extracts resulting from the treatment of mineral lubricating oils from the purpose of separating non-aromatic hydrocarbons (the raffinate and finished oil) from the aromatic hydrocarbons (the extract and waste product) can be used and are preferred as starting materials.

Since the general process of refining mineral lubricating oils in which solvent extracts are obtained is well known, and these materials are fully disclosed in said copending applications, it is only necessary for present purposes to list the properties of five illustrative examples as shown in Table I.

TABLE I.—SOURCES AND PHYSICAL CHARACTERISTICS OF SOLVENT EXTRACTS

| Ext. No. | Crude Source | Solvent | API Grav. | Sp. gr. at 10° F. | Vis/100° F. | Vis/130° F. | Vis/210° F. | V.I. | ° F. Pour | ° F. Flash | ° F. Fire | Iodine No. (Wijs) | Percent C.R. | Percent Sulfur |
| --- | --- | --- | --- | --- | --- | --- | --- | --- | --- | --- | --- | --- | --- | --- |
| 1 | East Tex | Phenol | 11.1 | | 23,319 | 4,750 | 282 | −40 | +55 | | | | 7.2 | 2.66 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.88 |
| 9 | Santa Fe Springs. | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.1 | | |
| 11 | Penn | Chlorex | 12.2 | 0.9843 | | | 1,365 | | +85 | 560 | 630 | 71.4 | | |
| 12 | do | Nitrobenzene. | 10.0 | 1.000 | | | 1,500 | | +75 | 555 | 640 | 60 | | |
| 13 | Mid-Cont | Propane-cresol. | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.8 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 23 | do | do | | | | | | −55 | +70 | | | | 1.1 | 2.75 |
| 41 | do | do | 17.6 | | | | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis neutral, has an average molecular weight of 300, and contained 76.8% aromatics (by the silica gel procedure).

Extract No. 42 was obtained in the production of 150 Vis Bright Stock has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis neutral, has an average molecular weight of 340, contained 84.1% aromatics, 15.9% saturates, analyzed 86.4% carbon, 10.7% hydrogen, and averaged 2.7 aromatic rings per aromatic molecule.

Extract No. 44 was obtained in the production of 200 Vis neutral, has an average molecular weight of 340 and contained 87% aromatics and 13% saturates.

Extract No. 45 was obtained in the production of 160 Vis Bright Stock and contained 92% aromatics and 8% saturates.

The solvent extracts from lubricating oils used as starting materials have the following general properties and characteristics, part of which characteristics are shared by the monobasic or monocarboxylic acids derived therefrom:

TABLE II

| Characteristics: | Range of value |
|---|---|
| Gravity, ° API | 7.3–18.3 |
| Gravity, sp., 60/60° F. | 0.945–1.022 |
| Viscosity SUS @ 210° F. | 40–1500 |
| Viscosity index | −128–+39 |
| Pour point (max.) | +35–+100 |
| Molecular weight, average (above 300) | 320–750 |
| Boiling point (initial) °F. | 300–1000 |
| Boiling point (end) °F. | 400–1200 |
| Sulfur, percent weight (total) | 0.5–4.5 |
| Sulfur compounds, percent by vol. | 20–50 |
| Aromatic compounds, percent v. | 25–90 |
| Neutral aromatic hydrocarbons, percent v. | 40–51 |
| Av. No. of aromatic rings/mean arom. mol. | 1.7–5.0 |

Upon chemical characterization, as is shown in said copending applications, Extract Nos. 19, 20, 21, 43, and 44 of Table I have been shown to contain about 12.5% of saturated hydrocarbons, 25.0% of mononuclear aromatics (substituted benzenes), 30.0% of dinuclear aromatics (substituted naphthalenes), 15.0% of trinuclear aromatics (10% substituted phenanthrenes and 5% substituted anthracenes), 0.9% of tetranuclear aromatics (0.5% substituted chrysenes, 0.2% substituted benzphenanthrenes and 0.2% pyrenes) and about 0.01% pentanuclear aromatics (perylene). About 16.5% of sulfur, nitrogen and oxygen compounds are present, mainly in the form of heterocyclic compounds or substituent rings. The average molecular weight of Extracts 19 and 21 is 340 and of Extract 20 is 590.

The solvent extract starting material may be vacuum-distilled, dewaxed and/or clay-contacted and/or hydrogenated, prior to use in preparing the complex carboxylic acids from which the selected fractions used in accordance with this invention are derived. Dewaxing can be accomplished by known methods, e.g., treatment with 45% MEK and 55% toluene as the dewaxing solvent, using temperatures in the order of −10° F., and solvent/solvent extract ratios of about 8/1. This treatment results in a dewaxed extract which has a pour point of about +5° F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–500 p.s.i.g. using temperatures of 530–600° F. in the presence of a molybdena-silica-alumina catalyst. This same method can be applied to the solvent extracts per se, that is after the separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are ° API, 9.5; color, NPA, 7; flash (COC), 420° F.; fire (COC), 465° F.; pour point, −5° F.; vis. @ 100° F., 1075 SUS; vis. @ 210° F., 58.5 SUS; VI, −96; neut. No. (1948), 0.05; sulfur, 2.60 wt. percent and C.R. percent 0.01.

The catalytic cracking of those fractions of crude petroleum oils between diesel burning oil and vacuum residuals furnishes sources of complex, high-molecular weight poly-nuclear aromatic and heterocyclic compounds utilizable as alternate feed materials for the preparation of the complex carboxylic acids and the novel polyester products of this invention. The Orthoflow Fluid Catalytic Cracking process of the M. W. Kellogg Co. is illustrative wherein any of the heaviest virgin gas oils that do not contain excessive heavy metal contents (which cause catalyst poisoning) are treated to fluid catalytic cracking to produce gasoline, heating oils, heavy fuel oils, and fuel gas. During the process at least two by-product streams are produced which are sources of complex polynuclear aromatic sulfur-containing compounds that can be utilized in accordance with this invention, namely, the heavy FCC cycle stock (or so-called heavy gas oil) and the decant oil. The preparation of these by-product streams is illustrated as follows, said description is not to be construed as limiting and it is to be understood that other catalytic cracking processes can be used to produce similar by-product streams.

In a typical operation, mixed reduced crudes and several virgin gas oil streams comprising as many as 12 different feed components such as light vacuum distillates and heavy vacuum distillates, from FCC feed preparation units, solvent extracts from the preparation of neutral and light stock lubricating oils (as herein defined) and heavy virgin distillates i.e., heavy gas oils from the distillation of crude oils, in an amount of about 23,750 b.p.s.d., is preheated by exchange and sent to the Orthoflow converter equipped with reaction, catalyst stripping, air regeneration and catalyst circulation facilities. The cracked hydrocarbon vapors, steam and inert gas are sent to the base of a fractionator tower wherein the vapors are cooled and washed free of catalyst. Sufficient cooling is accomplished by the circulation of bottoms reflux over baffles, and by downflow from the tray above, to disuperheat the entering material and to condense the slurry recycle and decanted oil. Heated oil recovered from the tower by the slurry reflux is used for reboiling in the recovery and catalytic polymerization sections, for preheating fresh feed and for the generation of steam in a waste heat boiler.

The slurry settler in the base of the fractionator, separated therefrom by a solid internal head, is fed by the slurry reflux pump. Decanted oil is recycled to the base of the fractionator in order to maintain a low concentration of catalyst in the slurry reflux. The net decanted oil flows through a cooler and is pumped to storage while the thickened slurry flows into the stream of recycle gas oil returning to the reactor inlet. Both a light gas oil (herein referred to as light FCC recycle stock) and a heavy gas oil (herein referred to as a heavy FCC recycle stock) are withdrawn at appropriate trays of the fractionator. The tray between the top of the scrubbing section and the heavy FCC cycle stock drawoff pan removes any entrained slurry reflux or catalyst that may carry over. Above this tray the total drawoff pan collects the heavy FCC cycle stock for removal from the tower and recycle to the reactor and as reflux to the tower. A portion of this stream after cooling, is sent to storage. Light gas oil product, lean oil, gland oil, overhead vapors and gas streams are recovered in the upper sections of the tower, and separately processed, i.e., the gas from the process is compressed subjected to catalytic polymerization. The 23,750 b.p.s.d. of feed produces about 11,506 b.p.s.d. of gasoline, 2,381 b.p.s.d. of heating oil, 8,944 b.p.s.d. of heavy fuel oil and 1,263 b.p.s.d. of fuel gas.

In the treatment of 17,750 b.p.s.d. of fresh feed comprising distillates using a synthetic cracking catalyst at 900° F., 70% conversion at 1.5 through-put ratio (total charge divided by fresh feed) about 2,840 b.p.s.d. of $C_4$ hydrocarbons, 8,700 b.p.s.d. of $C_5$–400° gasoline, 4,438 b.p.s.d. of 400–600° light FCC cycle stock and 887 b.p.s.d. of decant oil is produced.

To illustrate, 17,004 b.p.s.d. of fresh feed and 4,253 b.p.s.d. of vacuum heavy gas oil from the vacuum tower (total 21,257 b.p.s.d.) is subjected to fluid catalytic cracking at about 900–880° F. using a standard cracking catalyst at a catalyst to oil ratio of about 8.4/1, space velocity of about 2.4 to produce 4,152 b.p.s.d. of light catalytic distillate, 7,516 b.p.s.d. of heavy gas oil recycle, 1,920 b.p.s.d. of decanted oil and 497 b.p.s.d. of net slurry recycle. The characteristics of the heavy cracked gas oil and decanted oil are shown in the following table.

IBP=589° F.; 90%—745° F. The use of these latter starting materials is described in copending application Ser. No. 79,661.

The results of hydrogenation of several of the solvent extracts shown in Table I to produce hydrogenated or dewaxed and hydrogenated solvent extracts as starting materials for the preparation of the complex acid mixture and subsequent ester preparation are shown in Table IV.

TABLE IV.—HYDROGENATION OF SOLVENT EXTRACTS AND PRODUCTS

| | Run Number | | | | | | | | | Range of Conditions and Product Properties |
|---|---|---|---|---|---|---|---|---|---|---|
| | 1 | 2 | 3 | 4 | 5 | 6 | 7 | 8 | 9 | |
| Reaction Conditions: | | | | | | | | | | |
| Extract No. | 43 | 44 | 44 | 44 | 41 | 43 | *43 | 44 | *44 | |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., °F | 700 | 700 | 650 | 650 | 650 | 675 | 700 | 700 | 720 | 650–720 |
| Pressure, p.s.i.g. | 500 | 500 | 400 | 300 | 400 | 400 | 500 | 500 | 500 | 300–500 |
| Catalyst | Filtrol | Filtrol | Filtrol | Filtrol | Filtrol | Filtrol | Filtrol | Filtrol | Filtrol | Filtrol |
| Products: | | | | | | | | | | |
| Neut. No. | 0.13 | 0.14 | 0.52 | 0.96 | 0.11 | 0.66 | 0.24 | 0.08 | 0.15 | .08–1.0 |
| Sulfur (wt. percent) | 2.4 | 3.19 | 3.07 | 3.05 | 1.75 | 2.7 | 2.6 | 2.7 | 2.7 | 1.5–3.5 |
| Grav., °API | 12.8 | 9.4 | 8.5 | 8.8 | 18.5 | 11.8 | 12.9 | 10.1 | 9.7 | 8.0–15.0 |
| Vis. at 100° F. | 663.7 | 1,133 | 1,457 | 1,452 | 132.5 | 808.7 | 851.1 | 464 | 1,058 | 450–1,500 |
| VI | −33 | −96 | −115 | −114 | −9 | −49 | −52 | −83 | −96 | −120—−9 |

*Dewaxed.

TABLE III.—PRODUCT CHARACTERISTICS

| | Heavy FCC Recycle Stock | | Decanted Oil | |
|---|---|---|---|---|
| | No. | No. 2 | No. 1 | No. 2 |
| Distillation— | | | | |
| ASTM D-1160 at 10 mm.: | | | | |
| IBP, °F | 151 | 173 | 177 | 198 |
| 5% | 299 | 305 | 351 | 346 |
| 50% | 368 | 369 | 455 | 449 |
| 95% | 429 | 433 | 644 | 645 |
| EP | 484 | 481 | 680 | 663 |
| ASTM D-1160 at 760 mm.: | | | | |
| IBP, °F | 367 | 394 | 399 | 425 |
| 5% | 549 | 556 | 611 | 605 |
| 50% | 632 | 633 | 734 | 727 |
| 95% | 734 | 740 | 949 | 950 |
| EP | 767 | 767 | 989 | 970 |
| ASTM D-158: | | | | |
| IBP, °F | 479 | 462 | | |
| 50% | 616 | 618 | | |
| EP | 712 | 712 | | |
| Viscosity, $C_9$ at: | | | | |
| 100° F | 6.16 | 6.16 | *22.0 | *22.7 |
| 130° F | 4.04 | 4.05 | 11.73 | 11.87 |
| 210° F | 1.88 | 1.89 | 3.74 | 3.76 |
| RI at 67° C | 1.4958 | 1.4965 | 1.5525 | 1.5520 |
| Pour Point, °F | +50 | +50 | +80 | +80 |
| Sulfur, wt. percent | 0.59 | 0.59 | 0.97 | 0.90 |
| Nitrogen, wt. percent | 0.02 | 0.02 | 0.03 | 0.03 |
| CR | 0.14 | 0.14 | 1.62 | 1.67 |
| Bromine No. | 2.8 | 2.7 | 7.9 | 8.0 |
| Aniline Point, °F | 155.0 | 154.0 | 154.0 | 153.0 |
| °API | 26.2 | 25.7 | 14.8 | 14.6 |

*Extrapolated values.

The catalyst used in these experiments was a silica-alumina fluid cracking catalyst.

The heavy cracked gas oil or heavy FCC cycle stock and decanted oil products above are illustrative of sources of complex high-molecular-weight polynuclear aromatic compounds to be used to prepare complex carboxylic acids from which the polyester resins of this invention are derived. These feed sources can be treated in a manner to increase the aromaticity or extract the complex aromatic compounds therefrom, for use in the metalation reaction, i.e., by solvent extraction with the known solvents (described herein) for this purpose.

For the FCC recycle stock this is illustrated by the 19% extract (phenol solvent) thereof, which extract had the following properties: °API, 1.8; sulfur, 1.9 wt. percent; Br No., 17; RI (20° C.), 1.6372 and Engler distillation;

Table IV also sets forth the range of conditions and product properties that are generally applicable in the preparation of hydrogenated solvent extracts as starting materials in the preparation of the complex acids to be used in this invention.

Without limiting the invention, the characteristics of the products of this invention as influenced by the complex acids are further disclosed as thus far evaluated. The mono-, di- and polycarboxylic acids used are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl or naphthenic radical varies between 5 to 22. Despite the size of the acid molecules the linkages through or between the carboxyl groups are about the same as those of phthalic and terephthalic acids. A portion of the aromatic rings or condensed aromatic rings are probably further condensed with naphthenic rings to form configurations similar to the steriod ring systems. Extract acids from solvent extracts obtained in the production of bright stocks probably contain more highly condensed aromatic structures.

Another typical example of an FCC decant oil is one having an API gravity of 15.4°, IBP, 375° F. and EP, 995° F. at atmospheric pressure; cs. vis. @ 100° F., 21.00; cs. vis. @ 210° F., 3.66; percent S, 0.870; Ramsbottom C, 1.70, mol. wt., 320, vis. gr. con. .945; Br No. 8.0. The 47 vol. percent extract from this decant oil has a specific gravity of 1.095, exhibits the same initial boiling point and end boiling point and has the following characteristics: cs. vis. @ 100° F., 223.5; cs. vis. @ 210° F., 7.80; percent S, 1.44; Ramsbottom C, 5.7; vis. gr. con., 1.103, Br No. 14.0, which is another species of the starting material. Most of the sulfur is in the form of heterocyclic rings with carbon, associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurtz, King, Stout, Partikan and Skrabek, (Anal. Chem., 28, 1928 (1956)). They are soluble in ethyl ether, acetone, methyl ethyl ketone, tetrahydrofuran, benzene, toluene and xylene.

For purposes of this invention the complex carboxylic acids are defined as being produced by metalation, carbonation and acidification of a source of complex high-molecular-weight polynuclear aromatic and heterocyclic compounds of petroleum origin containing sulfur, said acids having molecular weights of about 300 to 750, predominate in acids containing one carboxyl group per molecule, contain about 1.0 to 4.5% by wt. of sulfur and have nuclei which have about 1.7 to 5.0 aromatic rings per mean aromatic molecule.

*The preparation of the complex acids*

The preparation of the complex acids having radicals derived from solvent extracts is accomplished by mixing the solvent extract with an excess of alkali metal, e.g., sodium, and a reaction solvent such as tetrahydrofuran at about −20° C. to form an adduct which is treated with carbon dioxide at about the same temperature to form the alkali metal salts of the mixed mono-, di- and polycarboxylic complex acids. Impurities present in the solvent extracts cause undesirable side reactions. The side reactions can be eliminated by several expedients.

In carrying out the reaction, one expedient found advantageous resides in the use of a preformed sodium dispersion in an inert liquid. Such dispersions and their preparation are well known in the art. According to said application Serial No. 819,932, a large excess of dispersed sodium must be used to initiate the reaction, unless steps are taken to remove the coating of undesired reaction products from the sodium surface.

Still another expedient, and the preferred one, is the actual preparation of a sodium dispersion in the solvent extract to be reacted. The undesirable impurities appear to completely react with the sodium during preparation of the dispersion, and as a consequence, clean sodium surface is available for the desired reaction as soon as the "active ether" or reaction solvent is mixed with the sodium-reactive-component mixture. The desired reaction then is practically instantaneous and proceeds smoothly and rapidly to completion with only a slight excess of sodium.

When the reaction with alkali metal is complete, as evidenced by its dissolution, the reaction mixture is treated with carbon dioxide, either at about the same or a different temperature as was used during the reaction with alkali metal. The reaction mixture is next washed with water and allowed to separate into a solvent phase and a water phase. Several applications of 1 volume of water per 5 volumes of reaction mixture may be used and the water layers collected. Countercurrent water-washing may be used. The resulting water phase is acidified with an acid such as a hydrohalic acid, sulfuric acid, or phosphoric acid. This causes the mixture of mono-, di-, and polybasic, polynuclear acids to separate or precipitate from the aqueous mixture.

The following example illustrates the preparation of the acid mixture from which selected monobasic acids are fractionated.

EXAMPLE I

One hundred gms. of solvent extract and 675 ml. of dry tetrahydrofuran were charged to a one-liter, 3-necked flask equipped with a stirrer, thermometer, pressure-equalized drop-funnel, gas-inlet with rotometer, and gas-outlet. A dry nitrogen atmosphere was maintained. Approximately 100 gms. of Alundum balls 5/16″ diameter were charged and agitation started. The solution was cooled to −20° C. and 8.3 gms. of sodium as a 20% dispersion in toluene were added. After 5 minutes, no reaction had occurred and the solution was allowed to warm. After 25 minutes, the temperature had risen to −7° C. and a few particles of sodium appeared to be reacting, i.e., the deep color of the complex was seen to be forming on the surface of a few particles when agitation was momentarily stopped. Within an additional 17 minutes, the reaction was proceeding smoothly and the dry carbon dioxide atmosphere was introduced to the flask in excess at −18° C. over a period of 78 minutes. The reaction mixture was worked up by water washing after the excess sodium was destroyed with water. Hydrogen evolution from the remaining sodium indicated that 48% of the sodium had reacted. Approximately 84.5% of the oil was recovered, indicating 15.5% had reacted. The acids recovered weighed 22.5 gms. and had a saponification value of 241, indicating an equivalent weight of 233, and contained 2.8% sulfur. With a similar experiment, the acids recovered had a saponification value of 323, indicated 173 equivalent weight, with an indicated average molecular weight (cryoscopic) of 600. They contained 3.0% sulfur. The ratio of molecular weight to equivalent weight was 3.4, indicating a mixture containing acids with an average of more than 2 acid groups per molecule.

The mono-, di-, and polybasic polynuclear acids produced are mixtures of acids having aromatic nuclei of the naphthalene, phenanthrene, and anthracene type, having several alkyl groups on each aromatic nucleus, and wherein the content of sulfur, nitrogen, and oxygen is in the form of heterocyclic rings associated therewith. The acids are more accurately described as mono- and dihydrocarboxylic acids since there is a change in structure with the introduction of the carboxyl groups. A very simplified structure, without showing the position of the numerous alkyl or cycloalkyl side chain substituents on the nuclei, for the monocarboxylic acid fractions may be:

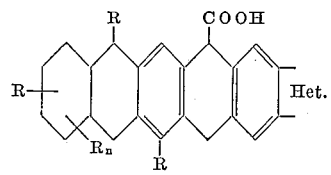

where R comprises alkyl substituents and cycloparaffin rings (1–3 rings/mole) having a sum of about 15 to 22 carbon atoms in each formula, $n$ is the number of such alkyl or cycloalkyl groups, which may be from 3 to 10, and "Hetero" illustrates one or more S-, N-, or O-containing heterocyclic rings in the molecule. The molecular weight of the acids ranges from above about 300 to 750, and the average is from 325–450.

Part A of Table V gives the general properties of a typical solvent-extract-derived mono-, di-, and polybasic acid product from which selected monocarboxylic acids can be separated, and Part B gives the properties of a number of example complex acid mixtures from which selected fractions of a predominantly monocarboxylic acid can be obtained for use in this invention.

TABLE V

A. GENERAL PROPERTIES

| Property | Value |
| --- | --- |
| Acid number | 140–300 |
| Melting point, °C. | 80–90 |
| Bromine No. | 4–24 |
| Percent sulfur | 1.0–2.5 |
| Color | Deep red–dark brown |
| Percent unsaponifiables | 2–8 |

B. MIXED ACIDS PREPARED FROM SOLVENT EXTRACTS

| No. | Sap. Value | Mol. Wt. | Percent S | Br. No. | Percent Unsap. | Eq. Wt. | Eqs/ Mol. | Acid No. |
| --- | --- | --- | --- | --- | --- | --- | --- | --- |
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |

Any of the acids listed in Part B of Table V can be subjected to fractionation to obtain the predominantly monocarboxylic acids used in accordance with this invention.

EXAMPLE II

In accordance with the aforesaid copending application, Serial No. 161,355, which discloses one type of fractionation process to produce monobasic acids, a water solution containing 26 g./l. of the sodium salts of "extract acids," resulting from the metalation, carbonation and acidification of a solvent extract, was prepared. One hundred fifty ml. of the aqueous solution was treated with 1 ml. of hydrochloric acid, and the resulting liberated acid was extracted with 20 ml. of toluene. This resulted in Fraction No. 1 (Table VI). Then the acidification with hydrochloric acid and extraction steps were repeated in cyclic fashion on the remaining aqueous solution, until no more acid was obtained from the aqueous phase. After the "extract acids" had reached an acid number of 220 (Fraction No. 6, Table VI) the extraction solvent was changed to ether, since the higher-acid-number acids are insoluble in toluene. The results of this procedure are shown in Table VI.

TABLE VI

Original extract acid:
A.N. ---------------------------------- 218
Mol. wt. ------------------------------- 420
Percent unsaponifiable ----------------- 8.7
—COOH/mol. --------------------------- 1.66

| Fraction No. | Amount (g.) | Acid No. | Mol. Wt. | —COOH/mol. |
|---|---|---|---|---|
| 1 | 4.84 | 77 | 424 | 0.60 |
| 2 | 5.53 | 119 | | |
| 3 | 4.81 | 122 | 400 | 0.80 |
| 4 | 4.59 | 107 | | |
| 5 | 5.46 | 163 | 400 | 1.40 |
| 6 | 2.08 | 217 | | |
| 7 | 1.62 | 298 | 400 | 2.10 |
| 8 | 0.70 | 282 | | |
| 9 | 1.33 | 342 | 390 | 2.20 |
| 10 | 1.52 | 344 | | |
| 11 | 2.18 | 389 | 385 | 2.80 |
| 12 | 0.28 | 403 | | |

EXAMPLE III

Another water solution of 26 g./l. of sodium salts of "extract acids," prepared as in the preceding example, was used and treated with ether as the solvent from the beginning. First, a 150-ml. portion of the "extract acid" salt solution was extracted with 20 ml. of ether. Then, 1 ml. of concentrated hydrochloric acid and 10 ml. of water were added to the ether solution, and the acidic water phase was separated and combined with the stock solution. After the water phases had been combined, they were extracted again with ether, the ether solution was acidified with 1 ml. of concentrated hydrochloric acid and 10 ml. of water, and the water phase was again combined with the stock solution. This procedure was repeated until no more acid was obtained from the extract-acid-salt water solution.

The ether phases were washed twice with 10 ml. portions of water, and then the ether was evaporated to leave the acid fractions as products. These acid fractions had higher acid numbers than the fractions obtained by the method used in preceding Example II, indicating that some acid salt had been extracted along with the acids in Example II. The results of this method are given in Table VII.

TABLE VII

Original extract acid:
A.N. ---------------------------------- 218
Mol. wt. ------------------------------- 420
Percent unsaponifiable ----------------- 8.7
—COOH/mol. --------------------------- 1.66

| Fraction No. | Amount (g.) | Acid No. | Mol. Wt. | —COOH/mol |
|---|---|---|---|---|
| 1 | 0.99 | 39 | 475 | 0.33 |
| 2 | 2.72 | 104 | | |
| 3 | 3.72 | 128 | 405 | 0.92 |
| 4 | 3.96 | 143 | | |
| 5 | 3.66 | 152 | 400 | 1.10 |
| 6 | 3.07 | 157 | | |
| 7 | 3.07 | 161 | | |
| 8 | 2.81 | 175 | 400 | 1.25 |
| 9 | 2.62 | 167 | | |
| 10 | 3.09 | 195 | 440 | 1.50 |
| 11 | 2.37 | 191 | | |
| 12 | 2.89 | 247 | 415 | 1.83 |
| 13 | 2.46 | 271 | | |
| 14 | 2.47 | 285 | | |
| 15 | 2.20 | 325 | 400 | 2.30 |
| 16 | 2.12 | 408 | 430 | 3.13 |
| 17 | 0.45 | 406 | | |

Fractions 1 to 5 of Table VI and/or Fractions 1–10 of Table VII, or mixtures of same, are examples of monobasic extract acids that are used in accordance with this invention.

*The resins and their preparation*

In order to illustrate the invention, two fractions, I and II, of acids were obtained using the fractionation procedure of application Serial Number 161,355. These fractions had the following characteristics:

| | I | II |
|---|---|---|
| Acid Number | 230 | 160 |
| Molecular Weight | 400 | 380 |
| Percent Unsaponifiable | 3.1 | 3.4 |
| Approx. Percent Dibasic Acid | 60 | <10 |
| Approx. Percent Monobasic Acid | <40 | 90 |

Resin compositions were prepared as follows:

EXAMPLE IV

A 234-g. portion of acid (I), 121 g. of maleic anhydride, 136 g. of triethylene glycol, 96 g. of diethylene glycol, and 0.5 g. of quinone were charged to a resin kettle equipped with a mechanical stirrer and a reflux condenser with a water trap. As soon as the acid had become molten, the stirrer was started, and the mixture was heated to 400° F., where it was maintained for 4 hours. After the resulting resin had cooled to room temperature, the viscosity of the 65% resin-35% styrene solution was determined.

Then a mixture consisting of 65 g. of resin, 35 g. of styrene, 100 g. of silica flour, and 2 g. of glass wool was prepared, 1 g. of benzoyl peroxide, 1 g. of methyl ethyl ketone peroxide, 1.5 g. of cobalt naphthenate, and 0.75 g. of dimethyl aniline were added, and the mixture was poured in a cast and allowed to polymerize and then the cured castings were used for determinations of hardness and tensile strength. The results are tabulated below.

EXAMPLE V

A 293-g. sample of acid (II), 126 g. of maleic anhydride, 141 g. of triethylene glycol, 100 g. diethylene glycol, and 0.5 g. of quinone were combined in a resin kettle and processed as in Example IV. The resulting resin was combined with styrene, silica, glass wool and catalyst, and processed as in Example I; the results are tabulated below.

EXAMPLE VI

A 292-g. portion of acid (II), 126 g. of maleic anhydride, 141 g. of triethylene glycol, 58 g. of diethylene glycol, 24 g. of glycerine, and 0.5 g. of quinone were processed as in Example IV. The results are tabulated below.

TABLE VIII

| Exp. No. | Type of Acid | Polyol | Vis. of 35% Styrene Solution (Stokes) | Tensile* Strength (p.s.i.) | Hardness* (Shore A₂) |
|---|---|---|---|---|---|
| IV | I | 100% diol | 3.65 | 455 | 91 |
| V | II | 100% diol | 0.85 | 220 | 85 |
| VI | II | {89% diol, 11% glycerol} | 4.70 | 610 | 89 |

*Test results are on the resin, styrene, silica-flour, glass-wool formulation.

From these results, it is evident that Acid II, which is almost completely monobasic, cannot be used in conventional polyester formulations because the hardness and tensile strength are inadequate. However, a superior composition results when the monobasic acid is used in combination with a polyol (Example VI).

Other examples of predominantly monobasic complex acids to be used in accordance with this invention are prepared in accordance with application Ser. No. 207,741 by (1) dissolving the free acid mixture to be fractionated in a first solvent in which the mixture is readily soluble; (2) adding a small amount of an aliphatic solvent to precipitate or liberate a portion of the acids; (3) filtering the liberated acids from the resulting mixture; (4) adding another small amount of said aliphatic solvent to the remaining acid mixture solution; (5) again filtering the acids thus liberated; and (6) continuing this cyclic precipitation and filtration until the solute consists primarily of monobasic acids and the di-, tri-, and tetra-carboxylic acids have been separated. Illustrative examples from application Ser. No. 207,741 are given as follows:

EXAMPLE VII

A 40.0 g. portion of extract polybasic acids (EPA) having an acid number of 214, a molecular weight of 410, and 4.8% unsaponifiables, was dissolved in 100 ml. of toluene. To this solution, 70 ml. of n-heptane was added. The resulting precipitate was filtered, washed with pentane, and dried, and the dried precipitate was designated as Fraction 1. This procedure was repeated with additional 25, 30, 35 and 40 ml. of n-heptane to yield, respectively, Fractions 2, 3, 4, and 5. Beyond this point, it was not possible to recover crystalline precipitates of high acid number. The characterization of the fractions is presented in the tabulation immediately below:

TABLE IX

| Fraction No. | Heptane Used (ml.) | Amount (g.) | Acid No. | Mol. Weight | —COOH/mol. | Percent Unsap. |
|---|---|---|---|---|---|---|
| Charge | | 40.0 | 214 | 410 | 1.57 | 4.8 |
| 1 | 70 | 1.48 | 305 | | | |
| 2 | 25 | 1.65 | 296 | 410 | 2.16 | |
| 3 | 30 | 2.66 | 292 | | | |
| 4 | 35 | 2.00 | 285 | 420 | 2.13 | |
| 5 | 40 | 1.67 | 258 | | | |

EXAMPLE VIII

An 80.0 g. portion of the same extract polybasic acid used in Example VII was dissolved in 150 ml. of toluene, and 20 ml. aliquots of this solution were precipitated with different amounts of n-heptane. The resulting precipitates were individually filtered, washed, and dried. The solute remaining in each filtrate was recovered by distilling off the mixed toluene-heptane solvent. The fractions so derived were characterized as follows:

TABLE X

| Fraction No. | Amount of n-Heptane Used (ml.) | Precipitate | | | | Filtrate | | | |
|---|---|---|---|---|---|---|---|---|---|
| | | G. | Acid No. | Mol. Wt. | —COOH/mol. | G. | Acid No. | Mol. Wt. | —COOH/mol. |
| Charge | | | 214 | 410 | 1.57 | | | | |
| 1 | 15 | 0.82 | 300 | 435 | 2.33 | 6.17 | 193 | 420 | 1.44 |
| 2 | 30 | 2.04 | 290 | | | 5.11 | 182 | | |
| 3 | 45 | 2.48 | 292 | 425 | 2.21 | 4.78 | 174 | 415 | 1.29 |
| 4 | 75 | 3.00 | 289 | | | 4.22 | 157 | | |
| 5 | 125 | 3.12 | 287 | 420 | 2.14 | 4.14 | 156 | 415 | 1.15 |
| 6 | 250 | 3.18 | 286 | | | 4.22 | 153 | | |

EXAMPLE IX

Different concentrations of the acid mixture used in Example VII above were prepared in toluene, and each was precipitated with a fixed amount of n-heptane. The tabulation below reports the results of these experiments.

TABLE XI

| Fraction Number | EPA/Toluene (g./ml.) | n-Heptane Added (ml.) | Acid No. of Precipitate |
|---|---|---|---|
| Charge | | | 214 |
| 1 | 2.7/10 | 250 | 236 |
| 2 | 5.3/10 | 250 | 236 |
| 3 | 8.0/10 | 250 | 287 |

Filtrate fraction numbers 1 through 6 and particularly filtrate fraction numbers 4, 5 and 6 of Table X and fractions 1, 2 and 3 of Table XI represent illustrative species of other complex acids to be used in accordance with this invention.

In accordance with application Ser. No. 207,780 (now U.S. Patent 3,180,876) selected fractions of the carboxylic acids are obtained by (1) dissolving a given amount of the complex mixture of acids to be fractionated in a critical amount of a first aromatic solvent other than benzene in which the free acids are fairly soluble; (2) adding a small and preselected amount of a second aromatic solvent which causes the precipitation of high acid-number polybasic acid as the first portion of the desired acids; (3) separating the liberated acids from the resulting mixture; (4) adding another selected or small amount of the second aromatic solvent to the remaining solution; (5) again separating the acids thus liberated or precipitated; and (6) continuing this cyclic addition of incremental amounts of said second solvent and subsequent separation until the first solvent is substantially free of the desired acids. In this process the second solvent may be the same as the first solvent and precipitation takes place by adding a small and preselected amount of the same, first solvent. The middle phase fractions of predominantly mono basic acids separated in accordance with copending application Serial No. 247,358 as described by the following examples can also be used to prepare the polyester resins and compositions used in accordance with this invention.

EXAMPLE X

A 2.17 g. portion of an extract polybasic acid was pulverized and dissolved in 60 ml. of water containing 2.39 g. NaOH and 10 ml. ether. This mixture was poured into a separatory funnel containing 60 ml. additional ether, and shaken vigorously. Then, 10.2 ml. of saturated NaCl solution (containing 2.96 g. NaCl) was added, and the mixture was shaken vigorously for 2 minutes. After settling, a three-phase system emerged: a light-yellow, upper phase, consisting of unsaponifiables in ether; a dark-brown middle phase, consisting of sodium salts of monobasic acids (including naphthenic acids) dissolved in ether-water mixture; a lower phase containing a water solution of sodium salts of di-, tri- and higher polybasic acids. Then, the phases were separated and acidified separately with HCl, and the organic acids released were extracted with ether. Finally, each ether extract was dried, yielding the products in the tabulation below:

EXAMPLE XII

A 3.22 portion of extract polybasic acid was pulverized and dissolved in 100 ml. of water containing 3.3 g. NaOH and 10 ml. of ether, this mixture was poured into a separatory funnel containing 100 ml. additional ether, and the funnel was shaken vigorously. Then, 20 ml. of saturated NaCl solution (containing 5.7 g. of NaCl) was added and the mixture was shaken vigorously for 2 minutes. After settling, a three phase system emerged: a light yellow upper phase consisting of unsaponifiables in ether; a dark brown middle phase consisting of sodium salts of monobasic acids (including naphthenic acids) dissolved in ether-water mixture; a lower phase containing a water solution of sodium salts of di-, tri-, and higher polybasic acids. Each phase was separated and acidified

TABLE XII

| | Original Charge | Fractional Products | | |
|---|---|---|---|---|
| | | From Upper phase | From Middle phase | From Lower phase |
| Wt. (g.) | 2.17 | 0.16 | 1.03 | 0.98. |
| Percent of Charge | 100 | 7.3 | 47.5 | 45.2. |
| Acid No. | 218 | 37 | 160 | 245. |
| Equivalent Wt. | 257 | | 351 | 229. |
| Appearance | Dark brown, crystalline | Yellow, soft solid | Very dark brown gummy prod. | Amber color, crystalline. |
| Essential Composition | Mix. of mono-, di-, tri- and higher polybasic acids. | Unsap. | Monobasic acids incl. naphthenic acids. | Di-, tri-, and higher polybasic acids. |

EXAMPLE XI

A 13.43 g. portion of an extract polybasic acid was pulverized and dissolved in 250 ml. of water containing separately with HCl, and the organic acids released were extracted with ether. Finally, each ether extract was dried, yielding the products described below:

TABLE XIV

| | Original Charge | Fractional Products | | |
|---|---|---|---|---|
| | | From Upper phase | From Middle phase | From Lower phase |
| Wt. (g.) | 3.22 | 0.12 | 2.10 | 1.00. |
| Percent of Charge | 100 | 3.7 | 65.2 | 31.1. |
| Acid No. of Fraction | 218 | 22 | 175 | 296. |
| Equivalent Wt. | 257 | | 321 | 190. |
| Appearance | Dk. brown color, crystalline. | Yellow, soft solid | Very dk. brown soft, gum. product. | Amber color, crystalline. |
| Essential Composition | Mixture of mono-, di- tri-, and higher poly basic acids. | Unsap. color bodies | Monobasic acids (incl. naphthenic acids). | Di-, tri-, and higher polybasic acids. |

9.45 g. NaOH and 25 ml. of ether. This mixture was poured into a separatory funnel containing 100 ml. additional ether and shaken vigorously. Then 62 ml. of saturated NaCl solution (containing 17.7 g. of NaCl) was added and the mixture was shaken vigorously for two minutes. After settling, a three-phase system emerged: a light yellow upper phase consisting of unsaponifiables in ether; dark brown middle phase consisting of sodium salts of monobasic acids (including naphthenic acids) dissolved in ether-water mixture; a lower phase containing a water solution of sodium salts of di-, tri-, and higher polybasic acids. The phases were separated and acidified separately with HCl, and the organic acids released were extracted with ether. Each ether extract was dried, yielding the products described below:

EXAMPLE XIII

An 0.84 g. portion of extract polybasic acid was pulverized and dissolved in 30 ml. of water containing 0.93 g. of NaOH and 5 ml. of ether, this mixture was poured into a separatory funnel containing 30 ml. additional ether, and the funnel was shaken vigorously. Then, 6 ml. of saturated NaCl solution (containing 1.7 g. of NaCl) was added, and the mixture was shaken vigorously for two minutes. After settling, a three-phase system emerged: a light yellow upper phase consisting of unsaponifiables in ether; a dark brown middle phase consisting of sodium salts of monobasic acids (including naphthenic acids) dissolved in ether-water mixture; a lower phase containing a water solution of sodium salts of di-, tri-, and higher polybasic acids, phases were separated

TABLE XIII

| | Original Charge | Fractional Products | | |
|---|---|---|---|---|
| | | From Upper phase | From Middle phase | From Lower phase |
| Wt. (g.) | 13.43 | 0.44 | 9.21 | 3.78. |
| Percent of Charge | 100 | 3.3 | 68.6 | 28.1. |
| Acid No. of Frac. | 218 | 18 | 178 | 309. |
| Equivalent Wt. | 257 | | 315 | 181. |
| Appearance | Dark brown color, crystall. | Yellow color, soft solid | Very dk. brown, soft gum. product. | Amber color, crystalline. |
| Essential Composition | Mixture of mono-, di- tri-, and higher polybasic acids. | Unsap. color bodies | Monobasic acids (incl. naphthenic acids). | Di-, tri-, and higher polybasic acids. | and acidified individually with HCl, and the organic acids thus released were extracted with ether. Each ether extract was dried, yielding the products described below:

Thus the resin formulation of this invention differs from conventional resin formulations in that it contains the monobasic acids derived from solvent extracts in

TABLE XV

| Original Charge | | Fractional Products | | |
| --- | --- | --- | --- | --- |
| | | From Upper phase | From Middle phase | From Lower phase |
| Wt (g.) | 0.84 | 0.10 | 0.40 | 0.34. |
| Percent of Charge | 100 | 11.9 | 47.6 | 40.5. |
| Acid Number | 263 | 39 | 166 | 295. |
| Equivalent Weight | 213 | | 338 | 190. |
| Appearance | Dk. brown color, crystalline. | Yellow color | Very dk. brown; soft, gum. product. | Amber color, crystalline. |
| Essential Composition | Mixture of di-, tri- and higher polybasic acids and unsap. | Unsap. and color bodies | Monobasic acids, incl. naphthenic acids. | Di-, tri-, and higher polybasic acids. |

EXAMPLE XIV

A 6.1 g. portion of extract polybasic acid, having an acid number of 206, was dissolved in 200 ml. of tetrahydrofuran and neutralized with a calculated amount of sodium hydroxide (0.89 g.) in 200 ml. of water. There was no separation of phases. Addition of a considerable amount of sodium chloride resulted in a separation of layers. Phases were then separated and independently acidified. Each acidified product was extracted with ether and the extract stripped. The two products were characterized as follows:

place of the conventional saturated dibasic acid, and polyol in place of at least part of the conventional diol.

This invention is directed to (1) the polyester resins per se, that is, the reaction product of a monobasic or substantially monobasic extract acid, an unsaturated dibasic acid, and a polyol or mixture of a polyol and a diol, (2) the polymerized and cross-linked product therefrom, (3) the styrenated polyester or polymerized polyester, and (4) mixtures of 1, 2 and 3.

The polyester resins of this invention are prepared by employing known procedures, e.g., reacting 1 mol mono-

TABLE XVI

| Original Charge | | Fractional Products | |
| --- | --- | --- | --- |
| | | From Upper Layer | From Lower Layer |
| Wt. (g.) | 6.1 | 3.3 | 2.8. |
| Percent of Charge | 100 | 54 | 46. |
| Acid Number | 206 | 150 | 230. |
| Equivalent Wt | 272 | 374 | 244. |
| Appearance | Dk. brown | Gray | |
| Essential Composition | Mixture of mono-, di-, tri- and higher polybasic acids and unsap. | Monobasic acids and unsap. | Di-, tri-, and higher polybasic acids. |

The predominantly monobasic acid fractions of EPA have acid numbers ranging from about 150 to 200 and a relatively pure monobasic acid fraction has an acid number of about 175. Such fractions form polyesters and polymerized polyesters haivng properties peculiarly suited for use in accordance with this invention.

The superiority of our resins is even more apparent from a comparison of Examples IV and VI. Usually, the hardness increases when the tensile strength is increased. Consequently, a conventional resin, such as that from Example IV, would be expected to have a hardness greater than 91 at a tensile strength of 610 p.s.i. It is apparent that our resins are more flexible at comparable tensile strengths, and stronger at comparable hardness, than the conventional resins.

The major constituents of conventional polyester resins are:

(1) Saturated dibasic acids, such as phthalic acid or phthalic anhydride.
(2) Unsaturated dibasic acids, such as maleic acid or maleic anhydride.
(3) Diols, such as ethylene glycol, propylene glycol, etc.

In accordance with this invention, we have discovered that a novel class of polyester resins can be prepared by polymerizing a mixture of (1) Complex polynuclear monobasic acids obtained by the fractionation of mixed mono-, di-, and polybasic acids derived from solvent extracts,
(2) Unsaturated dibasic acids, and
(3) A polyol, or a mixture of a polyol and a diol.

basic extract acid and at least 1 mol of unsaturated dibasic acid and 1 mol of polyol or polyol-diol mixture, with or without a known esterification catalyst, at temperatures ranging from about 350 to 500° F. The amounts of reactants may be varied in accordance with the following tabulation.

TABLE XVII

| | Monobasic Extract Acid | Unsat'd. DBA | Polyol |
| --- | --- | --- | --- |
| 1 | 1 mol (1 equiv.) | 1 mol (2 equiv.) | 3 equiv. |
| 2 | 2 mol (2 equiv.) | 1 mol (2 equiv.) | 4 equiv. |
| 3 | 2 mol | 2 mol (4 equiv.) | 6 equiv. |
| 4 | 2 mol | 1 mol (2 equiv.) | 4 equiv. |
| 5 | 1 mol | 1 mol (2 equiv.) | 3 equiv. |
| 6 | 1 mol | 2 mol (4 equiv.) | 5 equiv. |

The unsaturated dibasic acid in Table XVII is illustrated by maleic anhydride or any of the other unsaturated dibasic acids disclosed herein. In selecting the mol ratios of reactants to be used, the preferred procedure is to use an amount of polyol, or diol and polyol mixture, such that the total number of hydroxyl groups is at least equal to the total number of carboxyl groups plus a 10% excess.

Using RCOOH to illustrate the monobasic extract acid (R being the complex condensed ring radicals therefrom) maleic anhydride as the unsaturated dibasic acid, diethylene glycol as diol and glycerine as the polyol, the following formulae are representative of, but not limiting on, the invention:

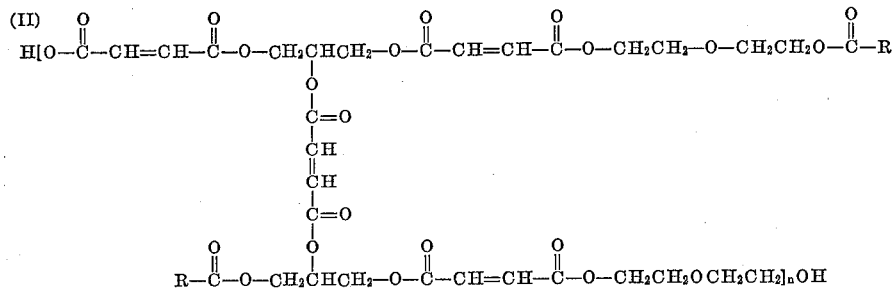

(III) The reaction products formed with a polymerizable monomer, i.e., the styrenated derivatives of I and II.

Due to the complexity of the R group and the novelty of the products, the chemical characterization results are considered as substantial evidence of both types of reactions.

When a dibasic acid reacts with a dihydric alcohol, both being of sufficient chain length, the product is a linear polyester which is terminated with carboxyl or hydroxyl groups or both, depending on the ratio of the reactants. Polyfunctional acids and alcohols, on the other hand, react to form eventually cross-linked, three-dimensional esters. The linear polymers are permanently thermoplastic and the presence of double bonds or other reactive groups allows cross-linking to occur by addition polymerization, oxidation, or vulcanization. The process of this invention employs two polyfunctional reactants and one difunctional or mono-functional reactant. Thus the products of this invention are complex and the formulae shown are merely illustrative.

The use of polyhydric alcohols in the reactions of this invention produces resins which are harder than those prepared from diols and monobasic acid and are stronger at comparable hardness than conventional polyester resins. The presence of the diol and polyol in the reaction mixture produces a resin which exhibits a balanced degree of thermosetting properties, making them useful where tensile strength, hardness and chemical resistance are desired. Thus the resins of this invention, properly called modified alkyd resins, find utility as electrical insulating materials, surface coatings, as bonding agents for fillers such as silica and mica, and for molding and casting applications. The styrenated alkyds of this invention are tough, durable, pale-colored products having rapid gelling characteristics.

The di- and polyfunctional alcohols used singly or in mixtures to prepare the polyesters of this invention have the formula $R^1(OH)_m$ wherein $R^1$ is a hydrocarbon radical containing 2 to 20 carbon atoms, may be substituted or not, saturated or unsaturated, and are of alkyl, aryl, alkaryl, aralkyl, cycloparaffinic, or cycloalkaryl configuration; $m$ is an integer greater than 1, i.e., from 2 to 10. This definition includes the dihydric alcohols, or glycols, such as alkylene glycols containing 2 to 20 carbon atoms which may be straight- or branched-chain glycols or mixtures of glycols, the polymethylene glycols, polypropylene glycols, ethylene glycol, propylene glycol, 2-methyl-1,2-propanediol, trimethylene glycol, 1,2-butanediol, 1,3-butanediol, tetramethylene glycol, 2,3-butanediol, isobutylene glycol, pentamethylene glycol, 1,4-pentanediol, 2,4-pentanediol, hexamethylene glycol, heptamethylene glycol, octamethylene glycol, nonamethylene glycol, alpha-butylene glycol, beta-butylene glycol, pinacol, decamethylene glycol, undecamethylene glycol, dodecamethylene glycol, tridecamethylene glycol, pentadecamethylene glycol, hexadecamethylene glycol, heptadecamethylene glycol, 2,2-dimethyl-1,3-propane diol, and 2,2-diethyl 1,3-butanediol.

Other aliphatic diols include 2-ethyl-1,3-propanediol, 1,3-hexanediol, 1,4-hexanediol, 2,5-hexanediol, 1,4-heptanediol, 2,4-heptanediol, 3-methyl-2,4-hexanediol, 2-methyl-3,5-hexanediol, 3-ethyl-2,4-pentanediol, 2-isopropyl-1,3-butanediol, 1,2-octanediol, 2,4-octanediol, 5-methyl - 2,4 - heptanediol, 2-methyl-2-butyl-1,3-propanediol, and 1,2-octadecanediol.

The alicyclic diols such as 1-(hydroxymethyl)-1-cyclobutanol, cis-1,2-cyclohexanediol, the cis- and trans-1,2-cyclohexanediols, cis-1,3-cyclohexanediol, 1-methyl-1,2-cyclopentanediol, cis - 1,2-dimethyl-1,2-cyclohexanediol, 1,1-dihydroxy-1,1'-dicyclopentyl and 1,1'-dihydroxy-1,1'-dicyclohexyl can be used.

The trihydric alcohols such as glycerol, diglycerol, butanetriol-1,2,3, pentaglycerol, glyoxal (hydrate); the polyalcohols, i.e., erythritol, pentaerythritol; dipentaerythritol, the pentitols, di-arabitol, 1-arabitol, adonitol, xylotol; the hexitols, namely, d-mannitol, d-sorbitol, di-iditol, dulcitol; and the heptols, i.e., persitol, volemitol, and castinitol or methyl heptol, also may be used.

The unsaturated di- and polyhydric alcohols can also be used including 2-butene-1,4-diol, 2-butyne-1,4-diol, 2-pentene-1,5-diol, 2-pentene-1,4-diol, 2-hexene-1,6-diol, 2-hexane-1,5-diol, 2-heptene-1,7-diol, 2-heptene-1,6-diol, 2-octene-1,4,5-triol, and 2-octadecene-1,4,6-triol.

Other alcohols include 2-methyl-pentanediol, 2-ethylpentanediol, 2-butyl-pentanediol, 2-isopropylpentanediol, 3-heptylpentanediol, 3-methylheptanediol, alpha-methyl glycerol, 2 - methyl-2-(hydroxymethyl)-1,3-propanediol, and 1,2,4-trihydroxy butane. Still others are represented by the polyoxyethylene glycols, alkylarylpolyethoxy glycols, etc.

The unsaturated dibasic acids used in accordance with this invention include but are not limited to, unsaturated dicarboxylic acids, e.g., maleic acid or anhydride, fumaric acid, bromomaleic acid, itaconic acid, citraconic acid or anhydrides, endomethylene tetrahydrophthalic acid (or anhydride) and its hexachloro derivative, mesaconic acid, chloromaleic acid etc. containing 2 to 20 carbon atoms and preferably containing 2 to 8 carbon atoms per molecule and being primarily aliphatic in nature. Saturated acids that may be used therewith are $C_4$ to $C_{20}$ dibasic acids, i.e., phthalic acid, terephthalic acid, oxalic acid, malonic acid, succinic acid, adipic acid, sebacic acid, glutaric, pimelic, sorbic and similar acids.

Additional examples to illustrate the invention are as follows:

EXAMPLE XV

| | Parts |
|---|---|
| Monobasic acids derived from solvent extracts | 405 |
| Maleic anhydride | 147 |
| Triethyleneglycol | 180 |
| 1,3-butylene glycol | 54 |
| Dipentaerythritol | 34 | are heated after the addition of 0.2% of quinone in an atmosphere of $CO_2$. At a temperature of about 350° F. there is evidence of esterification due to the production of water. The temperature is slowly increased to about 420° F. until water formation ceases. The polyester thus formed is further heated at about 400° F. under a vacuum of about 15 mm. for about 30 minutes. After cooling, 300 parts of the resin is mixed with 150 parts of styrene, about 4% of cyclohexanone peroxide (a 50% solution in cyclohexanone), and about 2.0% of cobalt naphthenate (a 6% solution in mineral spirits), and the resin hardens to a solid mass.

EXAMPLE XVI 390 parts of monobasic acid fraction No. 5 (Table VI)
147 parts of maleic anhydride
250 parts of triethylene glycol
25 parts of glycerol are reacted and further processed in substantially the same manner as described in the foregoing Example VI.

EXAMPLE XVII 524 parts of monobasic acid fraction No. 4 (Table VI)
195 parts of itaconic acid
162 parts of 1,3-butylene glycol
27 parts of pentaerythritol are reacted and further processed in substantially the same manner as described in the foregoing Example VI.

EXAMPLE XVIII 460 parts of monobasic acid fraction No. 3 (Table VI)
174 parts of fumaric acid
250 parts of triethylene glycol
29 parts of butanetriol-1,2,3 are reacted and further processed in substantially the same manner as described in the foregoing Example XV.

The polymerized products of this invention are more ductile at comparable tensile strengths and stronger at comparable hardness than conventional polyester resins. This is apparently due to the complex polynuclear heterocyclic group present in the monocarboxylic acid derived from sulfur compounds of petroleum origin as illustrated by solvent extracts.

The polyester intermediates are prepared by conventional esterification methods, with or without a catalyst. Any of the known esterification catalysts may be used to speed up the reaction, such as sulfuric acid, or other mineral acids, and boron trifluoride or other Lewis acids. The preferred method of ester synthesis involves refluxing about 1 mole of the complex monocarboxylic acid with no less than about 1 to about 2.0 mol of unsaturated dibasic acid (with or without added saturated dibasic acid) no less than about 1 mol of polyol or diol-polyol mixture. A diluent such as an inert solvent may be used when convenient for removing water as an azeotropic mixture. The reaction may be carried out at temperatures ranging from 350° to 500° C.

The polymerization reaction is also carried out by conventional methods using a small amount, less than 2%, of an initiator such as a Lewis acid or a peroxide, or a trace amount of an alkali metal. The reaction proceeds of its own accord, beginning at room temperature and gradually becoming exothermic. Means may be provided to control the exothermic reaction temperature so as not to exceed 200° F. One procedure is to dissolve the esters in a suitable solvent and add methyl ethyl ketone peroxide and subsequently cobalt naphthenate or dimethyl aniline slowly with agitation. The esters may be incorporated in paints or other coating materials and caused to polymerize into protective coatings by the addition of metallic driers such as those of the cobalt and lead naphthenate series. The resins are useful as laminating agents, shell-molding compounds and protective coatings.

In addition to the polymerizing catalyst disclosed herein, other suitable catalysts are acetyl peroxide, cumene hydroperoxide, azo-bis-isobutyronitrile, as well as numerous other peroxy-type catalysts known in the art.

The polymerizable unsaturated solvents (cross-linking monomers) suitable for use in formulating our polyester compositions include, as a preferred group, but are not limited to, styrene, methyl methacrylate, $\alpha$-methyl styrene divinylbenzene, vinyltoluene, chlorostyrene, diallylphthalate, triallyl cyanurate, etc.

Other monomers that may be used alone or with any of the foregoing include p-nitrostyrene, fumaronitrile, maleonitrile, dimethyl fumarate, p-cyanostyrene, vinyl methyl ketone, diethyl fumarate, methacrylonitrile, acrylonitrile, methyl methacrylate, $\beta$-chloroethylacrylate, $\alpha$-vinyl pyridine, m-bromostyrene, o-chlorostyrene, p-iodostyrene, m-chlorostyrene, 1-bromostyrene, p-chlorostyrene, methylacrylate, butadiene, p-dimethylaminostyrene, p-methoxystyrene, vinylidene chloride, diethyl maleate, dimethyl maleate, trichloroethylene, vinyl chloride, vinylacetate, vinyl ethyl ether, and tetrachloroethylene. The various known alkyl styrenes are included, such as o-, m-, and p-methylstyrene, the dimethyl styrenes, the trimethyl styrenes, the ethyl styrenes, the diethyl styrenes, the isopropyl styrenes, p-butyl styrene, p-heptyl styrene, m-sec-butyl styrene, the t-butyl styrenes and p-benzyl styrene.

The various chlorostyrene monomers i.e., $\alpha$-chlorostyrene, o-, m-, and p-chlorostyrene, the dichlorostyrenes, the trichlorostyrenes and pentachlorostyrene can be used. Other halogen-substituted styrene monomers are o-, m-, and p-bromostyrene, $\alpha$-bromostyrene, the fluorostyrenes, the trifluorostyrenes, and the like. Also the cyano-, carboxy-, hydroxy-, nitro-, and aminostyrenes such as o-cyanostyrene, m-hydroxystyrene, 2-carboxy-4,5-dimethoxy styrene p-nitrostyrene and o-aminostyrene can be used as the cross-linking monomer.

For most applications the cross-linking monomer is used in the range of from 1 to 2 moles to each mole of unsaturated acid or alcohol in the polyester. The inert particulate filler, for example, may be silica flour, sand, zinc oxide, iron oxide, barium sulfate, glass wool, fiber glass, powdered clay, rubber, cumarone resins, rosin, soya bean flour, cement, paraffin wax, ester gum, plaster of Paris, carbon black, asphalt, asbestos, sulfur, chalk, glue sodium silicate, bentonite, borax, and the like. In general, the inert filler will comprise 50–80% w. of the total formulation.

Known polymerization initiators, such as various peroxides, including but not limited to, the diacyl peroxides, such as benzoyl peroxide, benzoyl peroxide compounded with 50% of tricresylphosphate, lauryl peroxide, 2,4-dichlorobenzoyl peroxide compounded with dibutyl phthalate, p-chlorobenzyl peroxide, p-chlorobenzoyl peroxide compounded with 50% tricresyl phosphate, the diacyl acid peroxides, such as succinic acid peroxide, the ketone peroxides, such as methyl ethyl ketone peroxide, methyl ethyl ketone peroxide compounded in dimethyl phthalate, the aldehyde peroxides, such as hydroxyheptyl peroxide, the alkyl peroxides, including di-t-butyldiperphthalate, t-butyl perbenzoate, the alkyl hydroperoxides including t-butylhydroperoxide and others including caprylyl peroxide in mineral oil, acetyl peroxide, cyclohexanone peroxide, cyclohexanone peroxide with dibutyl phthalate, t-butyl peroxyisobutyrate in benzene, cumene hydroperoxide, pinane hydroperoxide, p-menthane hydroperoxide, t-butyl peracetate in benzene, dicumyl peroxide 2,5-dimethylhexane-2,5-dihydroperoxide and di-t-butyl peroxide.

Other free radical initiators that can be used are acetyl benzoyl peroxide, peracetic acid isopropyl percarbonate, cyclohexyl hydroperoxide, methylamyl ketone peroxide, lauroyl peroxide (technical grade), methyl cyclohexyl hydroperoxide, t-butyl permaleic acid, t-butyl perphthalic acid, p-chlorobenzoyl peroxide, di-t-butyl peroxide and dibenzal diperoxide.

The temperature at which the curing process is to be carried out, as is known in the art, becomes the primary consideration in selecting any of the foregoing initiators. Caprylyl peroxide, having an active oxygen % of 5.2 (equivalent to the active oxygen concentration of 1% benzoyl peroxide) will have a 15 minute gelling time at 142° F. and a 5 minute gelling time at 167° F. in a standard resin composition comprising 1.0 mole of complex carboxylic acids, 1.0 mole of diethylene glycol and 1.0 mole of maleic anhydride. Di-t-butyl peroxide with a 10.8% active oxygen content will have a 15 minute gelling time at 228° F. and a 5 minute gelling time at 253° F. in substantially the same resin composition. For any given resin-catalyst or initiator combination there is an optimum temperature at which the resin can utilize all of the free radicals formed by the peroxide decomposed at that temperature. Above that temperature, peroxide may be wasted, while below it too much time is required to obtain a complete cure.

Polymerization promoters are added to the resin system to speed up the decomposition of the initiator into free radicals. These are generally specific to the types of initiators used, i.e., those which are most effective with peroxide initiators, those most effective with hydroperoxide initiators and those which function for both, as is known in this art. Thus the metallic salts such as cobalt naphthenate and manganese naphthenate are used with hydroperoxides such as methyl ethyl ketone peroxide and cumene hydroperoxide. The aniline promoters such as, diethyl aniline and dimethyl aniline are used with peroxides such as benzoyl peroxides, the quaternary amines are used with hydroperoxides, and mercaptans, such as dodecyl mercaptan and mercapto ethanol are used with the hydroperoxides for best results. Any of these promoters are suitable for incorporation into the formulations of this invention to cause setting after the composition has been poured. The setting time can be varied to some extent by varying the amounts of initiator and promoter.

The embodiments of the invention in which an exclusive property or privilege is claimed are defined as follows:

1. The reaction product of a predominantly monocarboxylic acid fraction of mixed mono-, di- and polycarboxylic acids derived from solvent extracts obtained in the solvent extraction of mineral lubricating oils using a solvent selective for aromatic compounds by metalation of said solvent extracts to form the alkali metal adduct, carbonation of said adduct to form the alkali metal salt of the corresponding carboxylic acids, fractionation of said salt to recover the predominantly monocarboxylic acid salt and acidification of said salt fraction to form the free monocarboxylic acid fraction, said monocarboxylic acid fraction being characterized by an average molecular weight of about 300 to 750, and containing about 1.0 to 4.5 weight percent of combined sulfur in heterocyclic form and an average of 1.7 to 5.0 aromatic rings per mean aromatic molecule, and a polyol and an unsaturated dibasic acid under esterification conditions at a temperature of about 350° to 500° F.

2. The reaction product in accordance with claim 1 in which said product is formed by using a mixture of a diol and a polyol.

3. The reaction product in accordance with claim 1 in which said polyol has the formula $R'(OH)_m$, wherein R is a hydrocarbon radical containing 2 to 20 carbon atoms and $m$ has a value of 2 to 10.

4. The reaction product in accordance with claim 1 in which said unsaturated dibasic acid is of the group consisting of maleic acid, maleic anhydride, fumaric acid, chloromaleic acid, bromomaleic acid, itaconic acid, citraconic acid, mesaconic acid and mixtures thereof.

5. The reaction product in accordance with claim 1 in which said reaction is conducted using a mixture of saturated and unsaturated dibasic acids.

6. The reaction product of claim 1 which has been further polymerized with a polymerizable monomer.

7. A polyester resin prepared by reacting complex polynuclear aromatic monocarboxylic acids, an unsaturated dibasic acid, and a polyol under esterification conditions, said complex monocarboxylic acid being derived from phenol extracts, obtained in the solvent extraction of mineral oils, by subjecting said phenol extracts to metalation, carbonation, fractionation, and acidification to obtain a substantially monobasic acid and being characterized by an average molecular weight of about 300 to 750, and containing about 1.0 to 4.5 weight percent of combined sulfur in heterocyclic form and an average of 1.7 to 5.0 aromatic rings per mean aromatic molecule.

8. A polyester resin in accordance with claim 7 in which said monocarboxylic acid is characterized by having a molecular weight of more than 300, contains about 1.7 to 5.0 average number of aromatic rings per mean aromatic molecule and has an acid number of about 100 to 200.

9. A polyester resin in accordance with claim 8 in which said monocarboxylic acid fraction has the following characteristics:

| Characteristic | Value |
| --- | --- |
| Acid No. | 100–190. |
| Melting point | 40°–90° C. |
| Bromine No. | 4–24. |
| Percent sulfur | 1.0–2.5. |
| Color | Deep red to dark brown. |
| Percent unsaponifiables | 2–8. |

10. A styrenated polyester resin prepared by reacting a substantially monocarboxylic acid, an unsaturated dibasic acid, and a polyol under esterification conditions, said monocarboxylic acid being derived from solvent extracts, obtained in the solvent extraction of mineral oils using a solvent selective for aromatic compounds, and subjecting said solvent extracts to metalation, carbonation, fractionation, acidification to obtain a substantially monocarboxylic acid having the following characteristics:

| Characteristics | Value |
| --- | --- |
| Acid No. | 100–190. |
| Melting Point | 40°–90° C. |
| Bromine No. | 4–24. |
| Percent sulfur | 1.0–2.5. |
| Color | Deep red to dark brown. |
| Percent unsaponifiables | 2–8. | and copolymerizing the resulting unsaturated polyester with styrene.

11. A polyester resin prepared by reacting a substantially monocarboxylic acid with a dihydric alcohol and a polyhydric alcohol in stoichiometric amounts in the presence of quinone at a temperature of about 400° F., said monocarboxylic acid being derived from solvent extracts, obtained in the solvent extraction of mineral lubricating oils using a solvent selective for aromatic compounds, by metalation, carbonation, fractionation of the resulting carboxylic acid salt, and acidification and being characterized by an average molecular weight of about 300 to 750, and containing about 1.0 to 4.5 weight percent of combined sulfur in heterocyclic form and an average of 1.7 to 5.0 aromatic rings per mean aromatic molecule.

12. A polyester resin in accordance with claim 11 which has been reacted with styrene, benzoyl peroxide and a promoter.

13. A polyester resin prepared by reacting a substantially monocarboxylic acid with maleic anhydride, a dihydric alcohol, a polyhydric alcohol, and quinone in stoichiometric amounts at a temperature of about 400° F., said monocarboxylic acid being derived from solvent extracts, obtained in the solvent extraction of mineral lubricating oils using a solvent selective for aromatic compounds, by metalation, carbonation, fractionation of the resulting carboxylic acid salt, and acidification and being characterized by an average molecular weight of about 300 to 750, and containing about 1.0 to 4.5 weight percent of combined sulfur in heterocyclic form and an average of 1.7 to 5.0 aromatic rings per mean aromatic molecule.

14. The polymerized polyester resin formed by the reaction of
   (1) a complex polynuclear aromatic monocarboxylic acid obtained by metalation of solvent extracts of mineral lubricating oils using a solvent selective for aromatic compounds to form the alkali metal adduct, carbonation of said adduct to form the corresponding alkali metal salt of mixed complex carboxylic acids containing 1 to 7 carboxyl groups per molecule, fractionation of said salt mixtures to recover a predominantly monocarboxylic acid salt to form the free monocarboxylic acid, said complex monocarboxylic acid fraction being characterized by an average molecular weight of about 300 to 750, and containing about 1.0 to 4.5 weight percent of combined sulfur in heterocyclic form and an average of 1.7 to 5.0 aromatic rings per mean aromatic molecule.
   (2) an unsaturated dibasic acid and
   (3) a polyol, under esterification conditions.

15. The polymerized polyester resin in accordance with claim 14 in which said product is formed by the reaction of a mixture of a diol and a polyol.

16. The polymerized polyester resin in accordance with claim 15 in which said diol is an alkylene glycol having 2 to 20 carbon atoms.

17. The polymerized polymerized polyester resin in accordance with claim 14 in which said monocarboxylic acid fraction has an acid number of about 150 to 200.

18. The polymerized polyester resin in accordance with claim 14 in which about 1.0 to 2.0 mol of said complex monocarboxylic acid, about 1.0 to 2.0 mol of said unsaturated dibasic acid and about 3.0 equivalents to about 6.0 equivalents of said polyol are reacted.

19. The polymerized polyester resin prepared by the reaction of (1) about 234 parts of a complex monocarboxylic acid fraction derived from phenol extracts of mineral lubricating oils by metalation, carbonation, acidification and fractionation, said acid fraction being characterized by having an acid number of about 230 and a molecular weight of about 400 and containing about 1.0 to 4.5 weight percent of combined sulfur in heterocyclic form and an average of 1.7 to 5.0 aromatic rings per mean aromatic molecule, (2) about 121 parts of maleic anhydride, (3) about 136 parts of triethylene glycol and (4) about 96 parts of diethylene glycol and (5) about 0.5 part of quinone at a temperature of about 400° F.

20. The polymerized polyester resin prepared by the reaction of (1) about 292 parts of a complex monocarboxylic acid fraction derived from phenol extracts of mineral lubricating oils by metalation, carbonation, acidification and fractionation, said acid fraction being characterized by having an acid number of about 160 and a molecular weight of about 380 and containing about 1.0 to 4.5 weight percent of combined sulfur in heterocyclic form and an average of 1.7 to 5.0 aromatic rings per mean aromatic molecule, (2) about 126 parts of maleic anhydride, (3) about 141 parts of triethylene glycol, (4) about 58 parts of diethylene glycol, (5) about 28 parts of glycerine and (6) about 0.5 part of quinone at a temperature of about 400° F.

References Cited by the Examiner
UNITED STATES PATENTS

| | | | |
|---|---|---|---|
| 2,209,198 | 7/1940 | Frolich | 260—76 |
| 2,610,168 | 9/1952 | Anderson | 260—864 |
| 2,837,566 | 6/1958 | Feldman et al. | 260—665 |
| 3,153,087 | 10/1964 | Kramer et al. | 260—665 |

MURRAY TILLMAN, *Primary Examiner.*

J. T. GOOLKASIAN, *Assistant Examiner.*